(12) United States Patent
Meinke

(10) Patent No.: US 9,627,780 B2
(45) Date of Patent: Apr. 18, 2017

(54) SYSTEM INCORPORATING CURRENT PATH BETWEEN CONDUCTIVE MEMBERS

(75) Inventor: Rainer Meinke, Melbourne, FL (US)

(73) Assignee: Advanced Magnet Lab, Inc., Palm Bay, FL (US)

( * ) Notice: Subject to any disclaimer, the term of this patent is extended or adjusted under 35 U.S.C. 154(b) by 464 days.

(21) Appl. No.: 13/877,766

(22) PCT Filed: Oct. 6, 2011

(86) PCT No.: PCT/US2011/055168
§ 371 (c)(1),
(2), (4) Date: Apr. 4, 2013

(87) PCT Pub. No.: WO2012/048160
PCT Pub. Date: Apr. 12, 2012

(65) Prior Publication Data
US 2013/0229086 A1    Sep. 5, 2013

Related U.S. Application Data

(60) Provisional application No. 61/390,787, filed on Oct. 7, 2010.

(51) Int. Cl.
*H01R 3/00* (2006.01)
*H02K 13/00* (2006.01)
*H02J 3/00* (2006.01)
*H02K 55/00* (2006.01)
*H02K 5/22* (2006.01)

(52) U.S. Cl.
CPC ............... *H01R 3/00* (2013.01); *H02J 3/00* (2013.01); *H02K 13/00* (2013.01); *H02K 55/00* (2013.01); *H02K 5/22* (2013.01); *Y02E 40/62* (2013.01)

(58) Field of Classification Search
CPC ...... H01R 39/646; H01R 3/00; H02K 13/003; H02K 5/22; H02K 55/00; Y02E 40/62; H01K 13/00; H01J 3/00
USPC .................................. 310/219, 178; 307/145
See application file for complete search history.

(56) References Cited

U.S. PATENT DOCUMENTS 2,964,679 A * 12/1960 Schneider ................ H05H 1/50
219/383
3,029,199 A * 4/1962 Bratenahl ................ H05H 1/12
310/11

(Continued)

*Primary Examiner* — Terrance Kenerly
*Assistant Examiner* — Ahmed Elnakib
(74) *Attorney, Agent, or Firm* — Stephen C. Thomas; Ferdinand Romano

(57) ABSTRACT

An electrical system having a current path formed in a region between first and second electrodes. When a low pressure is sustained in the region, and a plasma is generated in a portion of a gap between the electrodes, current flows across the gap from the first electrode to the second electrode. In one embodiment the system is operable as a motor or a generator, having a first electrode and a member including a second electrode which is rotatable with respect to the first electrode. In another embodiment a first conductor is positioned to carry current toward or away from a first terminal at a high temperature, and a second conductor is spaced apart from the first terminal to carry current toward or away from a second terminal when the second conductor is at a low temperature relative to the temperature of the first region.

12 Claims, 6 Drawing Sheets

(56) References Cited

U.S. PATENT DOCUMENTS

| | | | | |
|---|---|---|---|---|
| 3,514,553 | A * | 5/1970 | Bullis | B60L 5/005 |
| | | | | 191/56 |
| 5,284,411 | A * | 2/1994 | Enomoto | H01L 21/67784 |
| | | | | 198/619 |
| 5,601,653 | A * | 2/1997 | Ito | C23C 16/50 |
| | | | | 118/723 FE |
| 6,271,614 | B1 * | 8/2001 | Arnold | H01R 39/04 |
| | | | | 250/423 R |
| 7,348,703 | B2 * | 3/2008 | Bojiuc | H02K 3/28 |
| | | | | 310/154.02 |
| 8,177,048 | B2 * | 5/2012 | Sato | H01F 38/14 |
| | | | | 198/619 |
| 2003/0052564 | A1 * | 3/2003 | Wilsdorf | H01R 39/24 |
| | | | | 310/179 |
| 2005/0062389 | A1 * | 3/2005 | Davidson | B82Y 10/00 |
| | | | | 313/309 |
| 2007/0001462 | A1 | 1/2007 | McNeil | |
| 2007/0235419 | A1 * | 10/2007 | Kong | H05H 1/30 |
| | | | | 219/121.36 |
| 2008/0048513 | A1 | 2/2008 | Wilsdorf | |
| 2009/0095604 | A1 | 4/2009 | Johnson | |
| 2013/0221748 | A1 * | 8/2013 | Meinke | H01R 3/00 |
| | | | | 307/31 |

* cited by examiner

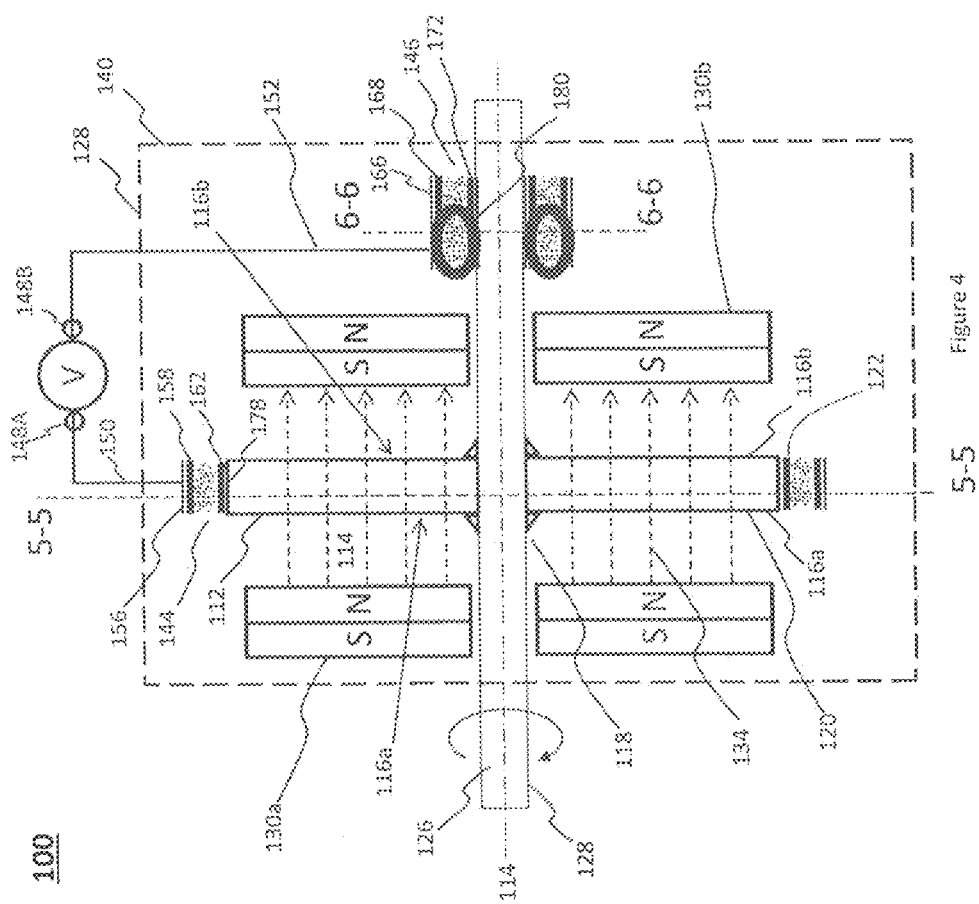

SYSTEM INCORPORATING CURRENT PATH BETWEEN CONDUCTIVE MEMBERS

RELATED APPLICATION

This application is the National Stage Application which claims priority to International Application No. PCT/US2011/55168 filed on Oct. 6, 2011 and U.S. Provisional Application No. 61/390,787 filed on Oct. 7, 2010.

FIELD OF THE INVENTION

The present invention relates to electrical systems and associated methods, including systems operable as motors or generators and systems in which electrical current is transmitted between a region of relatively high temperature and a region of relatively low temperature. In one series of embodiments the inventive concepts relate to systems in which one member is rotatable with respect to a second member and current is transmitted between the members. In another series of embodiments the inventive concepts relate to systems in which it is desirable to pass electrical current from a high temperature region into a low temperature region while limiting or eliminating thermal conduction of energy via wiring into the low temperature region.

BACKGROUND

It has been a common design practice to provide sliding contact arrangements (e.g., metal brushes) to pass current between the rotating members of electrical machinery and the stationary members, including stators and input or output terminals. Motors and generators are exemplary. In the case of large homopolar machines it has been necessary to provide a large number of sliding contacts in order to carry necessary levels of current into or out of the machine. In early designs of homopolar machines mercury had been used as a contact. Due to the toxic nature of mercury it has become common for all contacts to be mechanical in nature, resulting in friction and wear. Due to friction, sliding contacts also impose limits on the rotational speed of the motor/generator. It is desirable to provide an arrangement for transmitting electrical current between rotating and stationary components while reducing or eliminating friction and wear.

In operation of low temperature circuitry, e.g., including superconducting coils, it is necessary to conduct electrical current from an ambient temperature level (e.g., a typical room-temperature or the ambient temperature in an outdoor environment) into a low temperature environment present in regions that are typically cooled with cryogenic systems. The temperature difference between the room temperature and the cryogenic temperature in such applications can easily exceed 250 degree Kelvin and approaches 300 degrees Kelvin. The currents that need to be transferred from the relatively warm environment into the low temperature environment can range from milliamperes to many thousands of amperes. In the past, continuous copper rod conductors have been used to transfer the current from the warm environment into the low temperature environment. One end of such a conductor is permitted to be in the relatively warm state, typically at room temperature while a second end of the same conductor is maintained at the low temperature. The performance of such cooled current leads is governed by the relationship between electrical and thermal conductivity and their dependence on temperature. That is, electrical and thermal conductivity of metals increase with decreasing temperature. Accordingly, most heat in a current lead is generated in the high temperature region while less heat is generated in the cold temperature region. For a given current to be transferred through a conductive wire, the cross section of the wire can be optimized such that the temperature gradient along the wire matches the temperature difference between the high and low temperature regions while the temperature of the end of the wire which is at the room temperature end matches that of the room temperature environment.

A disadvantage associated with such conduction-cooled current leads stems from the high thermal conductivity of metals. The relationship between thermal conductivity, k, and electrical conductivity, σ is given by the Wiedemann-Franz law, $$\frac{k}{\sigma} = L_o * T$$

where the ratio of electrical conductivity and thermal conductivity is proportional to the temperature with an almost constant proportionality factor $L_o$. For a given temperature, the thermal conductivity is therefore proportional to the electrical conductivity. Furthermore, the Lorentz number $L_o$ is about equal for all metals. As a result of the Wiedemann-Franz law, all current lead cooling based on the above-described concept further introduces significant amounts of heat into the low temperature reservoir into which the electrical current is being transferred. Due to the Carnot efficiency as well as the inefficiency of any refrigeration system, removal of any such heat, introduced into the low temperature reservoir requires a much larger amount of energy to remove it. When maintaining a reservoir at a cryogenic temperature the resulting energy penalty factor is often as high as several hundred. Consequently, several hundred Watts of power may be required to remove 1 Watt of heat at, for example, a reservoir operating at a few degrees Kelvin. Heat transferred through current leads constitutes a primary heat load in the reservoir. This is a major impediment to efficient cryogenic cooling of electrical systems. Prior efforts to avoid the consequences of the Wiedemann-Franz law in cryogenically cooled systems have attempted to reduce the heat load caused by electrical current leads. This can be accomplished by gas-cooling of the conductive wires or through use of hybrid conductive wiring. Hybrid conductive wiring uses high temperature superconductors in the transition region between the high and low temperature environments because superconducting wiring, having zero resistance, generates no heat when current propagates through the wiring into the low temperature environment.

SUMMARY OF THE INVENTION

A feature of one series of embodiments according to the invention is an elimination of mechanical contacts from rotating electrical machinery, resulting in essentially frictionless transfer of current between a rotating member and a stationary member, e.g., a stator or the input or output terminals, of electrical machinery. This can be effected by forming a plasma current path between the rotatable member and the stationary member.

In one embodiment there is provided an electrical system operable as a motor or a generator which includes a first region in which a low pressure environment is sustainable relative to a higher ambient pressure. A first member is rotatable with respect to the one or more second members in the presence of a magnetic field. The first member includes a first electrode and the one or more second members include a second electrode which remains stationary while the first member rotates. The first and second electrodes are configured to provide a gap between the first and second electrodes. The gap is positioned within the first region. When the low pressure environment is sustained in the first region and when a plasma is generated in a portion of the gap between the first and second electrodes, a current path is formed between the first and second electrodes so that current flows across the gap from the first electrode to the second electrode or from the second electrode to the first electrode when the system operates as a motor or as a generator. In one design the first region is in a chamber which can sustain a partial vacuum sufficient to create a plasma between the first and second electrodes when a voltage exists between the first and second electrodes. The first member may be cylindrical in shape and rotatable about an axis, and the gap between the electrodes may extend 360 degrees about the axis. In one example the system may be a homopolar machine.

According to an associated method, a motor or a generator is operated. The motor or generator is of the type having a first member which is rotatable with respect to a second member in the presence of a magnetic field. A first electrode is positioned on the first member and a second electrode is positioned on the second member in a configuration which provides a gap between the first and second electrodes; A partial vacuum is developed in a region which includes the gap to provide a low pressure environment relative to a higher pressure ambient environment outside the region. A plasma is generated in a portion of the gap between the first and second electrodes to provide a current path between the first and second electrodes so that current flows across the gap from the first electrode to the second electrode or from the second electrode to the first electrode when the system operates as a generator or as a motor. An electrical output is provided from the first member for operation as a generator, or an electrical feed is provided to the first member for operation as a motor.

In another series of embodiments according to the invention, a system is provided in which electrical current is transmitted from a first region to a second region. The system includes a first segment of conductor positioned in the first region to carry current toward or away from a first terminal at a high temperature. The first region is characterized by a first pressure state. A second segment of conductor is positioned in the second region, spaced apart from the first terminal, to carry current toward or away from a second terminal when the second region is at a low temperature relative to the temperature of the first region. The first and second terminals are spaced apart, resulting in a gap between the first and second terminals. The gap is positioned in a third region which can sustain a low pressure relative to the first pressure state. When the low pressure is sustained in the third region and when a plasma is generated in a portion of the gap between the first and second electrodes, a current path is formed between the first and second conductors and across the gap from the first terminal to the second terminal or from the second terminal to the first terminal. In an illustrated example, the third region extends into the first and second regions. The first, second and third regions may all be regions within a cryogenic chamber, where the first region may be a relatively warm region, during times when the low pressure is sustained in the third region, while the second region is at a lower temperature.

Alternately, the first region may be at an ambient temperature, e.g., not within a cryogenic chamber, while the second region may be at a relatively low temperature state, perhaps two hundred to three hundred degrees (Celsius) cooler than the temperature of the first region.

An associated method for conducting electrical current between a relatively high temperature region and a relatively low temperature region may be practiced in a system having a first segment of conductor positioned in the first region and a second segment of conductor positioned in the second region. A terminal of the first segment is positioned in spaced apart relation to a terminal of the second segment to provide a gap between the first and second terminals. A partial vacuum is developed in a region which includes the gap to provide a low pressure environment relative to a higher pressure ambient environment outside the region. Electrical current is conducted between the first and second segments of conductor while the first region in the relatively high temperature state and the second region is in the relatively low temperature state. The conduction is had by generating a plasma in a portion of the gap between the first and second terminals to provide a current flow between the terminals of the first and second segments and across the gap, thereby providing a continuous flow of current between the first and second segments of conductor.

BRIEF DESCRIPTION OF THE DRAWINGS

FIG. 4 illustrates another electrical system according to an embodiment of the invention;

In accord with common practice, the various described features may not be drawn to scale, but are drawn to emphasize specific features relevant to the invention. Like reference characters denote like elements throughout the figures and text.

DETAILED DESCRIPTION

Before describing in detail exemplary systems and methods relating to the invention, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention. Also, the following embodiments are exemplary constructions which do not define limits as to structural arrangements or methods according to the invention. The embodiments are permissive rather than mandatory and are illustrative rather than exhaustive.

Figure 1:
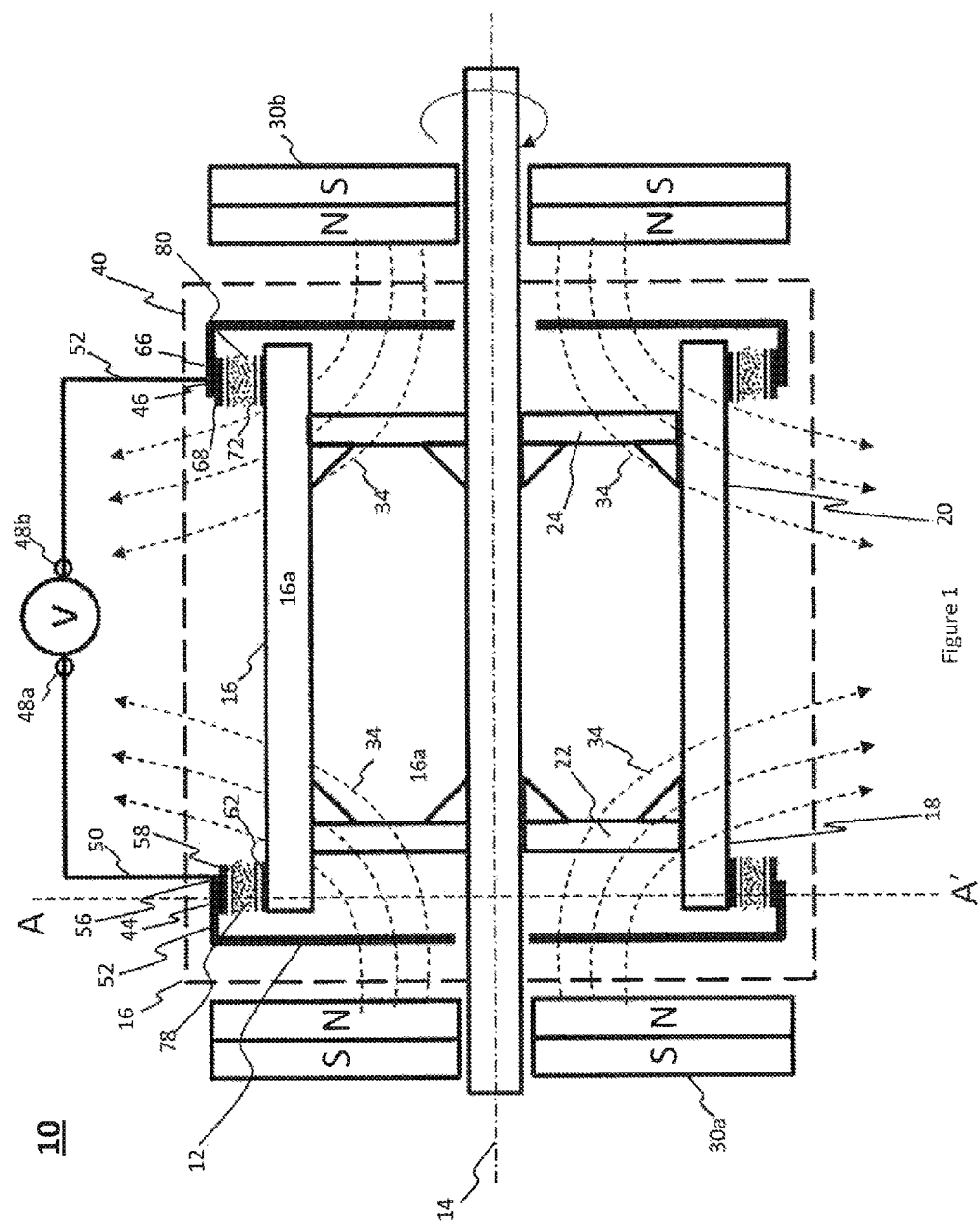
FIG. 1 is a view in cross section of an electrical system according to an embodiment of the invention.

FIG. 1 is a view in cross section of a first electrical system 10, which may function as a generator or a motor. The system 10 illustrates use of two frictionless plasma contacts, in lieu of sliding mechanical contacts, to transfer current between a rotating element and a stationary element in an electrical system. As used herein, a plasma enables transfer of electrical current between surfaces which are not physically contacting one another. The transfer is effected by movement of ions and electrons between the non-contacting surfaces, e.g., across a gap. The system 10 is a homopolar motor or generator which comprises a rotatable body 12 and multiple members, e.g., including one or more permanent magnets or field windings, which remains stationary while the body 12 rotates about an axis 14. The body 12 is generally in the shape of a cylinder, rotatable about a major axis 14, having a major cylindrically shaped surface 16 symmetrically positioned about the axis 14, with first and second opposing end regions 18, 20 along the axis 14. The cylindrically shaped surface 16 is the surface of a body component 16a which may, for example, be formed of a material with high conductivity like copper or aluminum. The body 12 includes first and second spaced apart end walls 22, 24, each positioned in a plane more or less orthogonal to the axis 14. The first end wall 22 is positioned in the first end region 18 and the second end wall 24 is positioned in the second end region 20. The view of FIG. 1 is taken along a plane passing through the axis 14.

A rotatable shaft 26, which extends along the axis 14 and through the body 12, is mounted via supports 28 to each of the end walls 22, 24 and to the cylindrically shaped surface 16 to mechanically couple the shaft 26 and the body 12 so that rotation of one results in simultaneous rotation of the other. In the example illustration of FIG. 1 the system includes a pair of stationary permanent magnets 30a, 30b, each positioned along a different one of the body end walls 22, 24. The permanent magnets each generate a magnetic field extending radially outward from the axis 14 (i.e., with field lines having a normal orientation with respect to the surface 16 of the body 12). The permanent magnets are oriented with like poles facing one another to generate opposing fields. This arrangement provides the field pattern 34 illustrated in FIG. 1, extending into the body component 16a and through the cylindrically shaped surface 16. Although the magnets are shown positioned outside of the body 12 on either side of the walls 22, 24, other configurations may result in provision of a suitable magnetic field which extends into the cylindrical body component 16a. For example, the permanent magnets may be positioned within the rotatable body 12. Further, in lieu of the permanent magnets, the system 10 may comprise a set of windings which generate a magnetic field extending into the body component 16a and through the surface 16.

The system 10 includes input/output supply terminals 48A, 48B. When the system 10 is operating as a motor, a voltage is applied across the terminals creating a current through the cylindrical body component 16a and from one terminal to the other. When the system 10 is operating as a generator, a voltage is generated across the terminals.

To effect current transfer between the terminals 48A, 48B and the cylindrically shaped surface 16 at least a portion of the system 10 is in a controllable environment within a chamber 40. During operation of the system 10 the chamber contains an atmosphere predominantly comprising an inert or noble gas (e.g., He, Ne, Ar) with low ionization energy, under a partial vacuum relative to an ambient pressure. By partial vacuum it is meant that gas pressure within the chamber 40 is lower than, for example, typical atmospheric pressure, in order to provide suitable conditions to generate and sustain a plasma within the chamber 40. For example, pressure in the chamber during operation of the system 10 may be in the range of 100 to 300 Pascal.

In the illustrated example, the chamber 40 encloses the body 12 and a pair of electrode assemblies 44, 46. The terminal 48A is connected to the electrode assembly 44 via a conductor segment 50, and the terminal 48B is connected to the electrode assembly 46 via a conductor segment 52 as shown in FIG. 1. The electrode assembly 44 includes a first stationary terminal 56 connected to a first stationary electrode 58 and a first rotatable electrode 62 which is spaced apart from and rotatable relative to the first stationary terminal 56. The electrode 62 is in fixed electrical contact with the cylindrically shaped surface 16.

Similarly, the electrode assembly 46 includes a second stationary terminal 66 connected to a second stationary electrode 68 and a second rotatable electrode 72 which is spaced apart from and rotatable relative to the second stationary electrode 68. The electrode 72, like the electrode 62, is also in fixed electrical contact with the cylindrically shaped surface 16. As further illustrated in FIGS. 2 and 3 for the electrode assembly 44, each of the first and second rotatable electrodes 62, 72 is surrounded in spaced-apart relation by an adjacent stationary electrode 58 or 68 which is concentrically positioned about the electrode 62 or 72. The distance between each stationary electrode 58 or 68 and the rotatable electrode 62 or 72 positioned along the surface 16 can be minimized based on achievable tolerances for the rotating arrangement.

During operation of the system 10, a current path extends from terminal 48A, into and out of the chamber 40, to terminal 48B as now described. Current travels from the terminal 48A, through the conductor segment 50, which extends into the chamber 40, to the first stationary terminal 56 of the first electrode assembly 44. The terminal 56 is electrically connected to the first stationary electrode 58. The first rotatable body electrode 62 is in electrical contact with the cylindrically shaped surface 16 of the rotatable body 12.

The first stationary electrode 58 includes a surface $S_{58}$ which faces a surface $S_{62}$ of the first rotatable body electrode 62. With the surfaces $S_{58}$ and $S_{62}$ spaced apart from one another the electrode assembly 44 provides a gap 78 which serves as a first plasma discharge region during operation of the system 10. Generation of a plasma within the gap 78 provides a current flow between the electrodes 58, 62 to effect continuity of current flow between the input/output supply terminal 48A and portions of the cylindrically shaped surface 16 adjacent the first electrode assembly 44.

The cylindrically shaped surface 16 provides a current path between the first rotatable electrode 62 and the second electrode assembly 46. The second rotatable electrode 72 is also in electrical contact with the cylindrically shaped surface 16 of the rotatable body 12.

The second stationary electrode 68 includes a surface $S_{68}$ which faces a surface $S_{72}$ of the second rotatable body electrode 72. With the surfaces $S_{68}$ and $S_{72}$ spaced apart from one another the electrode assembly 46 provides a gap 80 which serves as a second plasma discharge region during operation of the system 10. Generation of a plasma within the gap 80 provides a current flow between the electrodes 68, 72 to effect continuity of current flow between the input/output supply terminal 48B and portions of the cylindrically shaped surface 16 adjacent the second electrode assembly 46.

Each stationary electrode 58, 68 has an annular shape and may be formed a full 360 degrees about the adjacent rotatable electrode 62 or 72. Thus each of the electrode pairs has a concentric configuration with the rotating electrode formed on the surface of the rotatable body 12 and the stationary electrode 58, 68 spaced a small radial distance outward from the associated rotatable electrode 62 or 72. The electrodes 62, 72 are shown positioned along opposing ends of the cylinder, i.e., in the first and second opposing end regions 18, 20.

The amount of current passing through each gap 78, 80, needed for operation of the homopolar machine, is dependent on numerous parameters well known in the art, including the voltage across the gap and the amount of effective electrode surface area, along each pair of spaced apart electrode surfaces $S_{58}$, $S_{62}$ and $S_{68}$, $S_{72}$, available to sustain a plasma current across the gap. The amount of effective electrode surface area depends in part on the width, W, of each electrode as can be measured in a direction along the major axis 14 of the cylindrically shaped body 12.

The electrode surfaces $S_{58}$, $S_{62}$ and $S_{68}$, $S_{72}$ in the pairs 58, 62 and 68, 72 may each have widths (i.e., along the direction of the axis 14) of arbitrary size depending on the desired level of current through each gap 78, 80. The resulting current density is a function of the magnitude of current passing between the stationary electrode surface and the rotating electrode surface. Although, the torque of a homopolar motor or the generated voltage in case of a homopolar generator are proportional to the length of the current path through the magnetic field along the cylinder surface, The plasma current flow need not be limited to a small cross sectional area along the rotatable cylindrically shaped surface 16. Accordingly, there may be a minimization of current density flowing between the electrode surfaces or a maximization of current flow between the electrode surfaces for a given current density. With the rotatable body 12 having a diameter of one meter, an electrode contact width (as measured along the direction of the axis 14), of one centimeter and a corresponding circumference of 3.14 m, the surface area of the electrode region on the rotatable cylinder is 31,400 $mm^2$. Assuming the current transfer is evenly distributed across this area, for a 30 kA current, the current density is on the order of one Amp per $mm^2$. This calculation does not account for increased surface area attributable to features which can be provided along the electrode surfaces. In this regard, an exemplary surface contour or texture (not to scale) is shown for a pair of electrode surfaces 58, 62 or 68, 72 in the view of FIG. 3. Generally, the surfaces $S_{58}$, $S_{62}$ and $S_{68}$, $S_{72}$ may include nano-scale, cone-like features or other area enhancing features which can (i) reduce the threshold voltage for plasma generation and (ii) increase the achievable current transmitted across the gaps 78, 80. The nano-scale, cone-like features can be achieved with diamond microtips, which facilitate emission of electrons and offer low wear.

The illustrations of homopolar machines are simplified, but as is well known, several concentric cylinders can be provided to increase the torque of a homopolar motor or the output voltage of a homopolar generator. In this case each cylinder may have a pair of the disclosed plasma contacts, and outside of the magnetic field the cylinders are connected in series.

Figure 3:
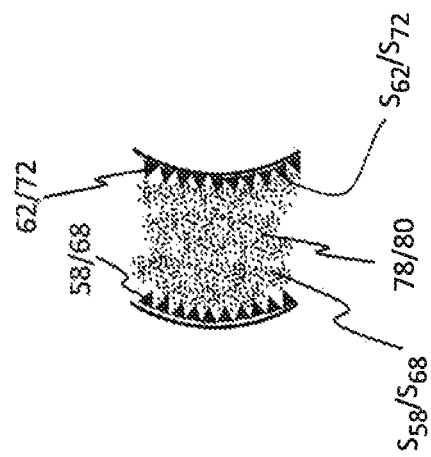
FIG. 3 is an enlarged view of a pair of electrodes shown in FIG. 2.
Figure 2:
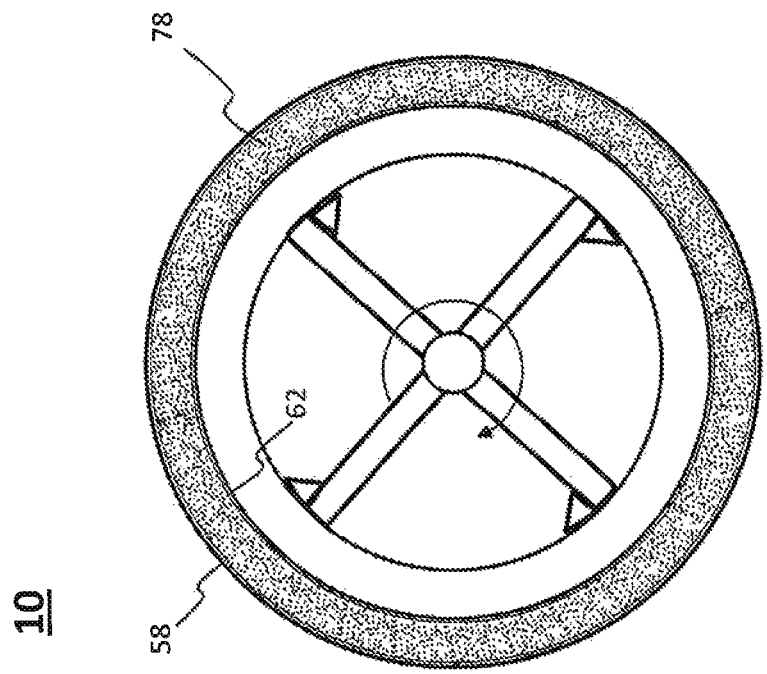
FIG. 2 is another view in cross section of the system shown in FIG. 1 which is taken along line A-A' of FIG. 1.

The principles of applying the plasma contacts to machine systems are not limited to the embodiment shown in FIGS. 1-3. As one example, FIG. 4 illustrates a second electrical system 100 which may function as a homopolar generator or motor. The system 100 utilizes plasma contacts to transfer electrical current between surfaces which are not physically contacting one another. In accord with embodiments of the invention, the system 100 provides frictionless contacts for transfer of electrical current between two components when one component undergoes motion with respect to the other component. The disclosed embodiments illustrate a component which undergoes a rotational motion during operation of the system, but the inventive concepts are not limited to homopolar motor or generator systems. The concept of using plasma contacts to effect electrical connections (e.g., in lieu of sliding mechanical contacts such as brushes) can be applied to DC motors that need current commutation and field windings (e.g., rotors) used for electrical excitation in normal conducting and superconducting synchronous machines instead of brush-less exciters. The same concepts can be applied to components which have other types of movement relative to one another (e.g., generally in lieu of sliding contacts in acyclic machines).

In the example of FIG. 4, the rotating element is a disc positioned between permanent magnets wherein current is conducted between the center of the disc and a peripheral region of the disc. As described for the system 10, the permanent magnets of the system 100 can be replaced with solenoids to establish a magnetic field which extends into the disc. Transfer of current between the components in the system 100 is effected by movement of ions and electrons between non-contacting surfaces, e.g., across a gap, to effect a continuous current flow.

FIG. 4 illustrates a rotatable disc 112 and multiple members, e.g., including one or more permanent magnets or field windings, which remain stationary while the disc 112 rotates about a major axis 114. The disc 112 may, for example, be formed of a highly conductive material like copper or aluminum. The disc 112 is generally in the shape of a short cylinder, rotatable about the major axis 114, having first and second opposing major side surfaces 116a, 116b which are circular in shape, each passing through a plane which is more or less orthogonal to the axis 114. The disc extends from a center region 118 through which the axis 114 passes to a peripheral region 120 along which a circular edge surface 122 extends from each side surface to the other side surface. The view of FIG. 1 is taken along a plane passing through the axis 114.

A rotatable shaft 126, which extends along the axis 114 is mounted through the disc 112 to mechanically couple the shaft 126 and the disc 12 so that rotation of one results in simultaneous rotation of the other. The shaft is rod shaped, formed of highly conductive material like copper or aluminum and having a cylindrically shaped outer surface 128. In the example illustration of FIG. 4 the system 100 includes a pair of stationary permanent magnets 130a, 130b, each positioned along a different one of the side surfaces 116a, 116b. The permanent magnets each generate a magnetic field extending in a direction along the axis 114 (i.e., with field lines having a normal orientation with respect to the side surfaces 116a, 116b of the disc 112). The permanent magnets are oriented with opposite poles facing one another to generate a relatively uniform magnetic field in the space between them. This arrangement provides the field pattern 134 illustrated in FIG. 4, extending into the side surfaces of the disc 112. Although the magnets are shown positioned on each side of the disc 112, other configurations may result in provision of a suitable magnetic field which extends through the side surfaces 116a, 116b and into the disc 112. Further, in lieu of the permanent magnets, the system 100 may comprise a set of windings which generate a magnetic field extending into or through the disc 112.

The system 100 includes input/output supply terminals 148A, 148B. When the system 100 is operating as a motor, a voltage is applied across the terminals resulting in a current flow through the disc. When the system 100 is operating as a generator, a voltage is generated across the terminals. To effect current transfer between the terminals 148A, 148B and the disc 112, at least a portion of the system 100 is in a controllable environment within a chamber 140. As described for the system 10, during operation of the system 100 the chamber contains an atmosphere predominantly comprising an inert gas with small ionization energy under a partial vacuum relative to an ambient pressure in order to provide suitable conditions to generate and sustain a plasma within the chamber 140, e.g., in the range of 100 to 300 Pascal.

In the illustrated example, the chamber 140 encloses the disc 112, a portion of the shaft 126 and first and second frictionless electrode assemblies 144, 146. The first electrode assembly 144 is positioned along the circular edge surface 122 of the disc 112 and the second electrode assembly 146 is positioned on the surface 128 of the shaft 126.

Figure 5:
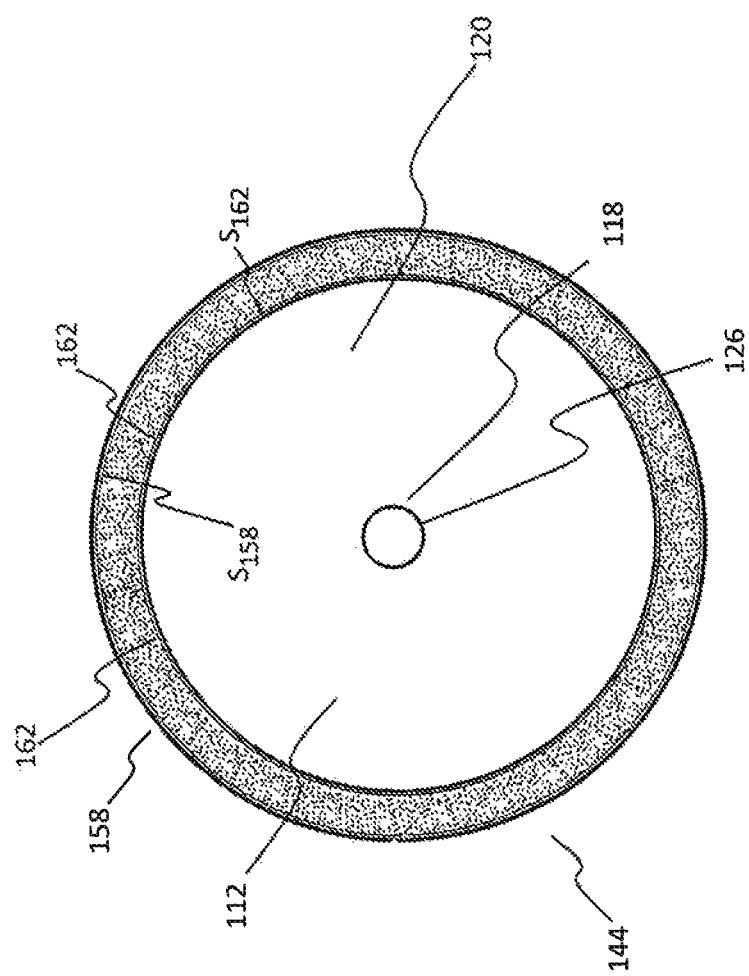
FIG. 5 is a partial view in cross section of the system shown in FIG. 4 taken along line 5-5 of FIG. 4.
Figure 6:
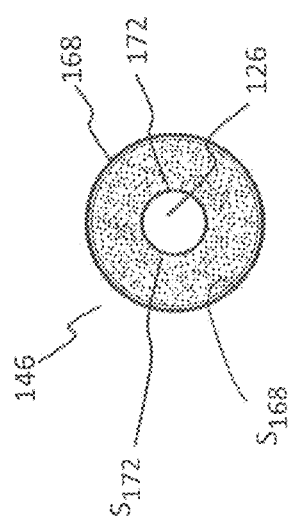
FIG. 6 is a partial view in cross section of the system shown in FIG. 4 taken along line 6-6 of FIG. 4.

The terminal 148A is connected to the first electrode assembly 144 via a conductor segment 150, and the terminal 148B is connected to the second electrode assembly 146 via a conductor segment 152 as shown in FIG. 4. The electrode assembly 144 includes a first stationary terminal 156 connected to a first stationary electrode 158 and a first rotatable electrode 162 which is spaced apart from and rotatable relative to the first stationary electrode 158. The electrode 162 is in fixed electrical contact with the circular edge surface 122 of the disc 112. See FIG. 5. The second electrode assembly 146, positioned on the shaft 126, includes a second stationary terminal 166 connected to a second stationary electrode 168 and a second rotatable electrode 172 which is spaced apart and rotatable relative to the second stationary electrode 168. The second rotatable electrode 172 is in fixed electrical contact with the cylindrically shaped outer surface 128 of the shaft 126. See FIG. 6.

Each of the first and second rotatable electrodes 162, 172 is surrounded in spaced-apart relation by an adjacent stationary electrode 158 or 168 which is concentrically positioned about the electrode 162 or 172. See FIGS. 5 and 6. The distance between each stationary electrode 158 or 168 and the adjacent rotatable electrode 162 or 172 can be minimized based on achievable tolerances for the rotating arrangement.

During operation of the system 100, a current path extends from the terminal 148A, into and out of the chamber 140, to terminal 148B as now described. Current travels from the terminal 148A, through the conductor segment 150, which extends into the chamber 140, to the first stationary terminal 156 of the first electrode assembly 144. The terminal 156 is electrically connected to the first stationary electrode 158. The first rotatable body electrode 162 is in electrical contact with the circular edge surface 122 of the disc 112.

The first stationary electrode 158 includes a surface $S_{158}$ which faces a surface $S_{162}$ of the first rotatable body electrode 162. With the surfaces $S_{158}$ and $S_{162}$ spaced apart from one another the electrode assembly 144 provides a gap 178 which serves as a first plasma discharge region during operation of the system 100. Generation of a plasma within the gap 178 provides a current flow between the electrodes 158, 162 to affect continuity of current flow between the input/output supply terminal 148A and portions of the circular edge surface 122 of the disc 12 adjacent the first electrode assembly 144. With the circular edge surface 122 contacting the electrode 162, the disc 112 provides a current path from the first rotatable electrode 162, through the disc 112, to the shaft and to the second electrode assembly 146 which is in electrical contact with the shaft 126.

The second stationary electrode 168 includes a surface $S_{168}$ which faces a surface $S_{172}$ of the second rotatable body electrode 172. With the surfaces $S_{168}$ and $S_{172}$ spaced apart from one another, the second electrode assembly 146 provides a gap 180 which serves as a second plasma discharge region during operation of the system 100. Generation of a plasma within the gap 180 provides a current flow between the electrodes 168, 172 to effect continuity of current flow between the input/output supply terminal 148B and portions of the shaft 126 adjacent the second electrode assembly 146.

Each stationary electrode 158, 168 has an annular shape and may be formed a full 360 degrees about the adjacent rotatable electrode 162 or 172. Thus each of the electrode pairs has a concentric configuration with one rotatable electrode 162 formed on the surface of the disc 112, with a second rotatable electrode formed along the rotatable shaft 126 and with each stationary electrode 158, 168 spaced a small radial distance outward from the associated rotatable electrode 162 or 172. Current entering the disc 112 along the circular edge region 122 via the rotatable electrode 162 travels to the center region 118 of the disc 112 and into the shaft 126 where follows a path to the rotatable electrode 172.

The electrode surfaces $S_{158}$, $S_{162}$ and $S_{168}$, $S_{172}$ in the pairs 158, 162 and 168, 172 may each have widths (i.e., along the direction of the axis 14) of arbitrary size depending on the desired level of current through each gap 178, 180. The resulting current density is a function of the magnitude of current passing between the stationary electrode surface and the rotating electrode surface. Generally, the plasma current flow need not be limited to a small cross sectional area along the circular edge region 122 or the shaft surface 128. Accordingly, there may be a minimization of current density flowing between the electrode surfaces or a maximization of current flow between the electrode surfaces for a given current density. As described for the electrode surfaces of the electrode assemblies of the system 10, the surfaces $S_{158}$, $S_{162}$ and $S_{168}$, $S_{172}$ may include nano-scale, cone-like features or other area enhancing features which can (i) reduce the threshold voltage for plasma generation and (ii) increase the achievable density of current transmitted across the gaps 178, 180. The nano-scale, cone-like features can be achieved with diamond microtips, which facilitate emission of electrons and offer low wear.

It will be apparent to those skilled in the art that several parallel discs like the disc 112 may be fixed to the rotatable shaft 126 to increase the torque of a homopolar motor or the output voltage of a homopolar generator. In this case each disc is equipped with its own dedicated plasma contacts and outside of the magnetic field the discs are connected in series.

In another series of embodiments according to the invention, electrical current is conducted from an environment having an ambient temperature level into a low temperature environment, or into the environment having the ambient temperature level from the low temperature environment. The low temperature environment may be in a region that is cooled with a cryogenic system. A feature of the embodiments is that introduction of heat into the low temperature region is limited by introducing a gap in the conductive path. Heat transfer into the low temperature environment does not follow the Wiedemann-Franz law because current transport occurs across the gap is maintained with a plasma whereby electrical conductivity is decoupled from thermal conductivity. Thermal conductivity into the low temperature environment is limited in the presence of electrical conductivity characteristics.

Figure 7:
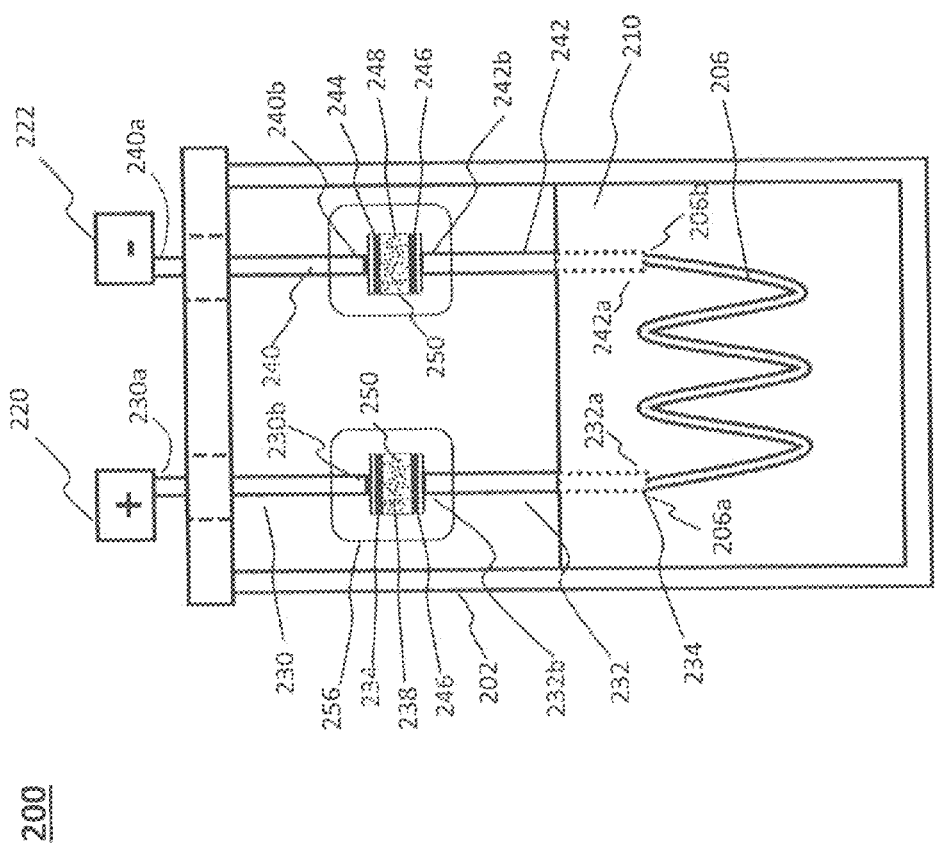
FIG. 7 is a simplified schematic illustration of a system according to another embodiment of the invention.

FIG. 7 is a simplified schematic illustration of a system 200 which includes a cryostat 202 in which a superconducting coil 206 is powered. The coil 206 is a winding having first and second opposing ends 206*a*, 206*b*. The coil 206 comprises a large number of turns (not shown) as may be required for electrical machinery, charged particle beam steering or other applications which benefit from generation of strong magnetic fields.

The coil 206 is immersed in a liquid cryogen 210, which can be liquid helium or nitrogen. The coil 206 is connected to an external power supply (not shown) through current paths 214, 216 which lead to power supply connection terminal blocks 220, 222. As is typical in high current applications, current paths are largely formed with solid copper bars constituting the current leads, but according to an embodiment of the invention each current path includes three segments. That is, the path from the terminal block 220 comprises a first segment 230 of copper bar having first and second opposing ends 230*a*, 230*b*, and a second segment 232 of copper bar having first and second opposing ends 232*a*, 232*b*. The first end 230*a* of the first segment of copper bar 230 is connected to the terminal block 220 and the first end 232*a* of the second segment 232 of copper bar is connected to the first end 206*a* of the coil 206. The second end 230*b* of the first segment of copper bar 230 terminates in an electrode 234 and the second end 232*b* of the second segment of copper bar 232 terminates in an electrode 236. The electrodes 234, 236 are separated from one another by a gap 238.

Similarly, the path from the terminal block 222 comprises a first segment 240 of copper bar, having first and second opposing ends 240*a*, 240*b*, and a second segment 242 of copper bar having first and second opposing ends 242*a*, 242*b*. The first end 240*a* of the first segment of copper bar 240 is connected to the terminal block 222 and the first end 242*a* of the second segment 242 of copper bar is connected to the second end 206*b* of the coil 206. The second end 240*b* of the first segment of copper bar 240 terminates in an electrode 244 and the second end 242*b* of the second segment of copper bar 242 terminates in an electrode 246. The electrodes 244, 246 are separated from one another by a gap 248.

Current transport across each of the gaps 238, 248 is established with a plasma bridge 250 which is maintained in a low pressure atmosphere of an inert or noble gas that has a low ionization energy, e.g., typically a few hundred Pascal for He, Ne or Ar. In this regard, the system 200 includes first and second vacuum chambers 256, 258. The chamber 256 encloses the second end 230*b* of the first segment 230 of copper bar, the second end 232*b* of the second segment 232 of copper bar, the electrodes 234, 236 and the gap 238. The chamber 258 encloses the second end 240*b* of the first segment 240 of copper bar, the second end 242*b* of the second segment 242 of copper bar, the electrodes 244, 246 and the gap 240. Each of the chambers 256, 258 and the electrodes 234, 236, 244, 246 function and the resulting gaps 238, 240 function in a manner similar to the chamber 40 and associated electrodes and gaps of the system 10, wherein an inert atmosphere is under a partial vacuum relative to an ambient pressure in order to generate a plasma current bridge between the electrodes.

The gaps 238, 240 between the segments of copper bars 230, 232 and 240, 242 can be placed to position the plasma bridge at an optimum location to minimize intrusion of heat into the chambers and thereby reduce the amount of heat which must be removed to sustain a desired operating temperature of the coil 206. The optimum location of the plasma bridge can be determined through a calculation that takes into consideration thermal and electrical conductivity of the conductor materials and the size (e.g., area in cross section) of the segments of copper bars. As illustrated for the electrodes of the embodiment of FIGS. 1-3, the electrodes of the system 200 may include surfaces having nano-scale peaks to facilitate electron emission at a low voltage or to facilitate ionization in the gas due to high electrical potentials near the tips of the peaks. The nano-scale, cone-like features can be achieved with diamond microtips, which facilitate emission of electrons and offer low wear.

While various embodiments of the present invention have been described, such embodiments are provided by way of example only. Numerous variations, changes and substitutions may be made without departing from the invention herein. Accordingly, it is intended that the invention be limited only by the spirit and scope of the appended claims.

The claimed invention is:

1. An electrical system operable as a motor or a generator, including a first region in which a low pressure environment is sustainable relative to a higher ambient pressure, the system comprising:
   a first member and one or more second members, the first member rotatable with respect to the one or more second members in the presence of a magnetic field, the first member including a first electrode, the one or more second members including a second electrode which remains stationary while the first member rotates, the first and second electrodes configured to provide a first gap between the first and second electrodes and positioned within the first region, wherein said magnetized field is characterized as having field lines having a normal orientation to a surface of said first member, and said first member is located within said field lines;
   wherein, when the low pressure environment is sustained in the first region and a plasma is generated in a portion of the gap between the first and second electrodes, a current path is formed between the first and second electrodes so that when the system operates as a motor or as a generator current flows across the gap from the first electrode to the second electrode or from the second electrode to the first electrode, said current flowing through a portion of said first member across the magnetic field lines.

2. The system of claim 1 wherein the first region is in a chamber which can sustain a partial vacuum sufficient to create a plasma between the first and second electrodes when a voltage exists between the first and second electrodes.

3. The system of claim 1 wherein the first member is cylindrical in shape.

4. The system of claim 1 wherein the first member is cylindrical in shape and rotatable about an axis, and the first electrode has an annular shape extending 360 degrees about the axis.

5. The system of claim 1 wherein:
   the first member is cylindrical in shape and rotatable about an axis; and
   the gap between the electrodes extends 360 degrees about the axis.

6. The system of claim 5 wherein the first member extends a width, W, along the axis and the gap extends along the axis a width less than W.

7. The system of claim 1 wherein the system comprises a homopolar machine.

8. The system of claim 7 wherein the first member is cylindrical in shape and rotatable about an axis and the one or more second members include one or more magnets that generate a radial magnetic field which extends outward from the axis.

9. The system of claim 1 wherein:
the region is in a chamber containing an inert gas;
the first member is cylindrical in shape and rotatable about an axis; and
the one or more second members include one or more permanent magnets that generate a radial magnetic field which extends outward from the axis.

10. The system of claim 1 wherein the first and second members and the first and second terminals are positioned within the region.

11. The system of claim 1 wherein one or more of the electrodes includes a surface having nano-scale peaks consisting, for example, of diamond microtips.

12. The system of claim 1, the first member further including a third electrode spaced away from the first electrode, the one or more second members including a fourth electrode spaced away from the second electrode which remains stationary while the first member rotates, the third and fourth electrodes configured to provide a second gap between the third and fourth electrodes and positioned within the first region wherein, when the low pressure environment is sustained in the first region, and a plasma is generated in a portion of the gap between the first and second electrodes, a current path is formed between the third and fourth electrodes so that current flows across the second gap from the third electrode to the fourth electrode or from the fourth electrode to the third electrode when the system operates as a motor or as a generator.

* * * * *